United States Patent [19]

McLaren

[11] 4,196,242
[45] Apr. 1, 1980

[54] FLAME RETARDANT PLYWOOD PANEL

[76] Inventor: John C. McLaren, 3177 Westhaven Dr., Anaheim, Calif. 92804

[21] Appl. No.: 855,494

[22] Filed: Nov. 28, 1977

[51] Int. Cl.² ............................................. B32B 3/24
[52] U.S. Cl. .................................. 428/138; 428/448; 428/452; 428/454; 428/535; 428/920
[58] Field of Search ............... 428/138, 139, 140, 448, 428/452, 537, 920, 921, 131, 156, 446, 454, 535

[56] References Cited

U.S. PATENT DOCUMENTS

| | | | |
|---|---|---|---|
| 1,951,983 | 3/1934 | Kellett | 428/464 |
| 1,974,465 | 10/1934 | Lewis | 428/479 |
| 2,665,460 | 1/1954 | Francek | 428/138 |
| 3,097,124 | 7/1963 | Denenberg | 428/138 |
| 3,216,167 | 11/1965 | Roberts et al. | 428/139 |
| 3,243,313 | 3/1966 | Aves | 428/139 |
| 3,296,060 | 1/1967 | Seitzinger | 428/140 |

*Primary Examiner*—George F. Lesmes
*Assistant Examiner*—Bruce H. Hess
*Attorney, Agent, or Firm*—Knobbe, Martens, Olson, Hubbard & Bear

[57] ABSTRACT

A flame retardant plywood panel has one or more structural core layers sandwiched between front and back veneer layers. In the preferred embodiment, the veneer layers are coated with an unfired ceramic material which hardens when exposed to a flame and prevents the flame from igniting the core and veneer layers. Perforations are preferably provided in the back of the panel for the ventilation of steam and other gases generated in the panel by exposure to high temperature.

23 Claims, 3 Drawing Figures

FLAME RETARDANT PLYWOOD PANEL

BACKGROUND OF THE INVENTION

This invention relates to plywood panels used in the construction of walls for buildings, mobile homes, residential homes, offices, trailer homes, boats, and the like. Particularly, the invention relates to the construction of a plywood panel which is flame retardant and which will maintain its structural integrity when exposed to a flame.

Typically, plywood wall panels consist of a bonded lamination of several layers of wood comprising one or more structural core layers of a strong, but inexpensive, wood with a thin wood veneer layer bonded to both the back and front sides of the core structure. The veneer layer on the front surface of the panel is usually of an expensive wood which has decorative qualities, in which case the veneer will be coated with a transparent finish which will allow the wood grain to show through. Alternatively, the veneer may be covered with a paper which is printed with a decorative wood grain. The layers of the laminated panel are bonded to one another by means of a glue.

Such plywood panels are strong, decorative, easily manufactured, and relatively inexpensive. However, such panels will ignite when subjected to a temperature of 1200 to 1500 degrees Fahrenheit and therefore such panels will be relatively rapidly consumed when exposed to a flame. This characteristic can contribute greatly to the spreading of a fire within the structure in which such panels are used.

Heretofore, flame retardant wall panels have generally been constructed from gypsum board. However, gypsum board panels are significantly heavier in weight than plywood panels. The relative heaviness of gypsum board panels is a particular disadvantage in such applications as mobile homes and boats, since more structural framing is required to support a gypsum board wall structure. The added wall structure, coupled with the weight of the gypsum board panels, thus results in a substantially heavier mobile home or boat. Furthermore, heavier panels are disadvantageous in any building application because of the inconvenience involved in moving and handling such panels.

Therefore, there has long been sought a wall panel which combines the flame-retardant qualities of gypsum board with the strength, lightness of weight, and economy of manufacture of plywood.

SUMMARY OF THE INVENTION

In the preferred embodiment of the invention, the front and back veneer layers of a plywood panel are coated with a thin layer of a ceramic mixture. When exposed to a flame, this ceramic coating hardens to form a non-combustible shield, which acts as a fire break, allowing heat to pass through and char the veneer and core layers without allowing open flame to ignite these wooden layers. A significant feature of the invention is that the wooden layers are merely charred and not consumed, and, therefore, a substantial portion of the original structural integrity of the panel is retained.

Perforations are preferably provided through the rear of the panel up to, but not through, the front veneer layer. These perforations provide for the dissipation of heat and steam and other gases which are produced within the panel when it is exposed to heat, thereby preventing the blistering and rupturing of the ceramic layers by a pressure buildup of these gases within the panel.

In an alternative embodiment of the invention, the veneer layers are bonded to the core layer or layers with a bonding agent that is essentially of the same ceramic composition as the aforementioned veneer coatings.

An additional important advantage of this invention is that the plywood panels having the aforementioned flame-retardant qualities also retain the substantial strength, lightness of weight, and ease and economy of manufacture that are characteristic of standard plywood panels.

DETAILED DESCRIPTION OF THE INVENTION

Figure 1:
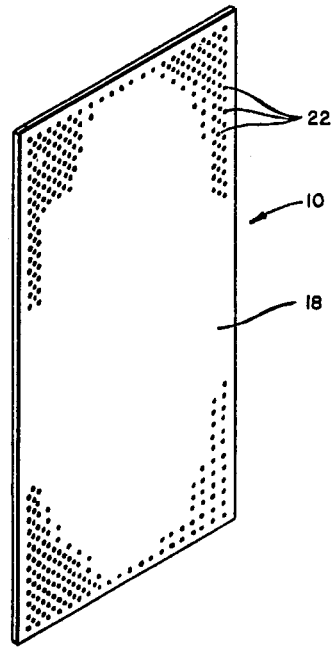
FIG. 1 is a rear perspective view of a plywood panel constructed in accordance with the present invention.
Figure 2:
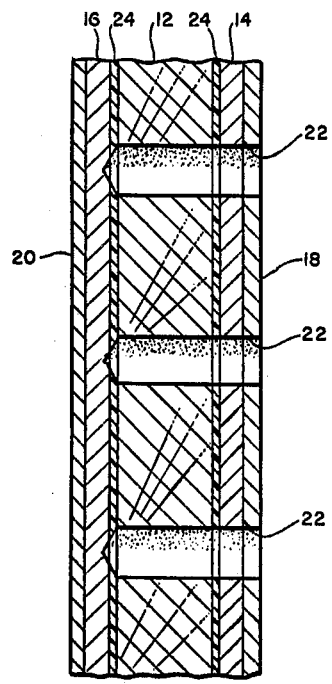
FIG. 2 is an enlarged fragmentary sectional view of the preferred embodiment of the invention.
Figure 3:
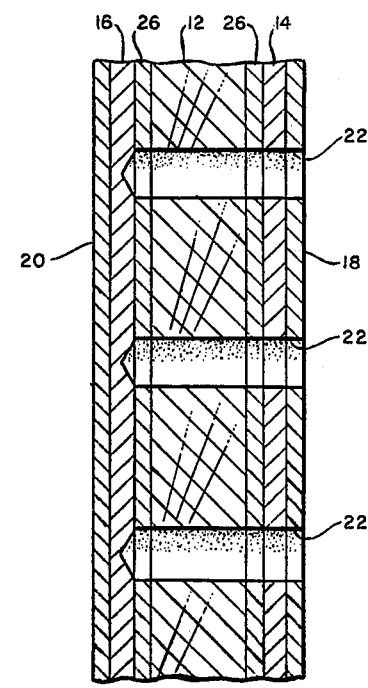
FIG. 3 is a view similar to that of FIG. 2 of an alternative embodiment of the present invention.

Referring to the figures, a plywood panel constructed in accordance with the present invention is designated by the numeral 10. As seen in FIGS. 2 and 3, the panel 10 consists of a lamination of a structural core layer 12, a back veneer layer 14, and a front veneer layer 16.

A backing layer 18 and a facing layer 20 of non-combustible material are applied to the outside surfaces of the back veneer 14 and the front veneer 16, respectively. Although several different types of non-combustible materials may be used for the layers 18 and 20, it has been found that a coating of a ceramic mixture wetly applied is most suitable for use as the backing and facing layers. This is so because such a ceramic composition, besides having the necessary property of being non-combustible, is also inexpensive, easily applied, self-adhering with the underlying veneer, and will maintain its integrity under exposure to high temperatures.

A specific example of such a ceramic composition which has been successfully used to make flame-retardant panels in accordance with this invention has the following formula:

5%–20% Clay (China clay or kaolin; 10% preferred)
5%–20% Feldspar (10% preferred)
5%–20% Silica (10% preferred)
10%–40% Aluminum hydrate (20% preferred)
10%–40% Talc (20% preferred)
5%–20% High borate content frit (such as is marketed by Pemco under the trademark Frit P-380; 10% preferred)
Approximately 20% Sodium silicate These ingredients are mixed with a relatively small amount of water to form a slurry which is then applied wet as the coating which constitutes the backing layer 18 and the facing layer 20. The thickness of the layers 18 and 20 is preferably about 3 to 5 mils when dry. Such a thickness may be conveniently obtained by applying a series of relatively thin coatings (approximately 3 mils wet), each of which is allowed to dry (thinning to a 1 to 2 mil thickness as it dries) before the next coating is applied until the ultimately desired thickness is achieved. When the ceramic composition is dry, the backing layer 18 and the facing layer 20 will thus each consist of a 3 to 5 mil thick layer of unfired ceramic.

The back of the panel is punctured with a multiplicity of perforations 22. These perforations 22 should extend from the ceramic backing layer 18 through all the successive layers up to, but not through, the front veneer layer 16. The perforations 18 may be conveniently provided by running the back of the panel under a tick embosser having pins which are modified to puncture the panel from the back and into, but not through, the front veneer layer 16. The number, size, and pattern of the perforations 22 is not critical. It is only necessary that enough area of the panel be perforated to perform adequately the venting of heat-produced gases, as will be presently described.

When the plywood panels are installed, the perforated back surface will face the rear side of the wall structure while the unperforated front surface will face the front side or interior of the room. When the panel is exposed to high temperature, as from a fire in the room, the unfired ceramic backing layer 18 and facing layer 20 will blister and foam and harden to become a ceramic film. As a result, these layers form a fire break, allowing heat to pass through the ceramic layers and char the veneer and core layers but not allowing open flame to pass through and ignite the interior wooden layers. This results from the fact that the front surface of the front veneer layer 16 is effectively sealed against the entrance of air, and therefore oxygen, by the formation of an unbroken, non-combustible shield by the ceramic facing layer 20 when that layer is exposed to a flame. The perforated back surface of the panel, which faces the supporting wall structure, is not exposed to the flow of air and therefore the perforations 22 will not permit the entrance of sufficient oxygen to cause ignition of the wooden layers.

When the panel is exposed to high temperatures, and the charring of the veneer and core layers begins, steam and other gases will be generated within the panel. The perforations 22 allow these gases to escape, thereby preventing pressure buildup from these gases which would rupture the ceramic layers, thereby defeating the fire break function described above. Further, the perforations serve to dissipate heat from the interior of the panel, thereby acting as an additional factor against the ignition of the wooden layers. The size and number of the perforations 22 will control the amount of gaseous matter which is allowed to escape. Therefore, it is necessary to ensure that the perforations are sufficient in quantity and size to prevent excessive buildup of gas pressure within the panel. Such a determination will depend on such factors as the thickness of the panel and the type of material of which it is made.

A significant feature of the invention is that although the wooden wall panel layers are charred and tend to deteriorate, the laminating ceramic layers remain substantially intact thereby maintaining the structural integrity of a wall for a period of time substantially longer than untreated plywood wall panel.

During the normal use of the plywood panel, the perforations 22 serve the additional function of allowing moisture to enter and leave the panel, thus allowing the panel to "breathe" in response to changes in ambient humidity, and thereby helping to prevent warping of the panel.

The preferred embodiment of the invention, as shown in FIG. 2, is easily manufactured. The manufacturing process is commenced with a ready-made plywood panel in which the veneer layers 14 and 16 are laminated to the core layer 12 by a glue-type bonding agent applied as shown in FIG. 2 as glue layers 24 with one such glue layer between the core layer 12 and the back veneer layer 14 and a second such glue layer between the core layer and the front veneer layer 16. This preassembled plywood panel is then coated on the back of the back veneer layer 14 with the ceramic backing layer 18. At this point the perforations 22 are made by a tick embosser, as previously described, and finally the ceramic facing layer 20 is applied in the manner previously described. Since the ceramic compound is not transparent, the wood grain of the front veneer layer 16 will not show through. Therefore, it is necessary, if a wood grain finish is desired, to cover the facing layer 20 with a paper having a wood grain finish. Alternatively, a pattern may be printed directly on the facing layer 20.

An alternative embodiment of the invention is shown in FIG. 3. This embodiment differs from the preferred embodiment in that the same ceramic compound which is used for the backing layer 18 and the facing layer 20, is also used as the bonding agent for laminating the front veneer layer 16 and the back veneer layer 14 to the core layer 12. Thus, as shown in FIG. 3, the veneer layers are joined to the core layer by ceramic bonding layers 26, one such bonding layer between the core layer 12 and the back veneer layer 14 and the second such layer between the core layer and the front veneer layer 16. Such construction necessitates a slightly different method of manufacture from that of the preferred embodiment. With this method, the core layer 12 is first coated front and back with the previously described ceramic compound to form the bonding layers 26. It has been found that a bonding layer thickness of approximately 2 mils gives good results. While the layers 26 are still wet, the veneer layers 16 and 14 are applied, and when the ceramic compound in the bonding layers 26 dries, the veneer layers are bonded to the core layer. The result is a plywood panel similar in all respects to the ready-made panel used in the preferred embodiment except for the nature of the bonding agent between the laminated wood layers. From this point, the method of manufacture is identical to that of the preferred embodiment. The backing layer 18 is applied, perforations 22 are formed by a tick embosser, and the face layer 20 is finally applied. As in the preferred embodiment, the face layer 20 may be directly printed or it may be covered with a printed paper.

As can be seen from a comparison of the two embodiments, the preferred embodiment offers the advantage of being adaptable for use with any ready-made plywood panel, and it is therefore relatively easily and inexpensively produced. The alternative embodiment offers the advantage of having the two additional ceramic layers 26, which, when exposed to high temperatures, will harden and act as additional fire breaks, much as the backing layer 18 and the facing layer 20. These layers 26 will therefore act to enhance the flame retardent effect in the panel while, at the same time, offering a somewhat greater degree of structural integrity.

Although the invention has been shown with a plywood panel having a single core layer, it is to be understood that either embodiment is readily adaptable to a panel having multiple core layers. In such a case, the core layers may be laminated to each other either by glue, as in the preferred embodiment of the invention, or by the ceramic compound, as in the alternative embodiment.

A specific example of a plywood wall panel embodying the preferred embodiment of the present invention was constructed as follows:

A ready-made panel was provided which was comprised of a 1/10-inch thick structural core layer of Lauan core stock with front and back veneer layers of 1/26-inch thick Lauan (A Grade on front, matching B Grade on back).

A ceramic slurry was prepared using the preferred proportions of the ingredients specified above. This slurry was then roller coated on the rear surface of the back veneer layer to a wet thickness of approximately 3 mils. This coating was allowed to dry down to a dry thickness of 1 to 2 mils, and then a second and third such coating were similarly applied and allowed to dry, resulting in total dry thickness for the ceramic backing layer of about 3½ to 4 mils.

A multiplicity of holes were then punched into the back of the panel up to, but not through, the front veneer layer. The holes were approximately 1/16-inch in diameter and spaced about 1 inch on center.

Finally, the ceramic facing layer was applied, in a like manner and thickness as the backing layer.

The panel so constructed was then tested for its flame-retardant qualities as follows:

A test section of 14 inches by 72 inches was cut from the panel and laid across the open top section of a tunnel kiln so that the ceramic facing layer was exposed to and impinged by the flame in the kiln. A draft was then induced in the kiln to draw the flame down the length of the panel.

The panel was exposed to the open flame in this manner for a period of 13 minutes and then removed from the flame. The panel showed no signs of ignition as a result of this exposure.

What is claimed is:

1. A flame-retardant wall panel, comprising:
   a perforated structural core layer having front and back faces;
   a first veneer layer attached by a first adhesive coating layer to said back face, said first veneer layer having perforations communicating with said perforations in said core layer;
   a second veneer layer attached by a second adhesive coating layer to said front face, said second coating layer having perforations communicating with said perforations in said core layer; and
   flame-proofing means applied to said first and second veneer layers for preventing a flame from igniting said first and second veneer layers and said core layer, while allowing heat from said flame to pass through said flame-proofing means to char said core layer and said first and second veneer layers, said flame-proofing means comprising:
   an unfired ceramic backing layer applied to said first veneer layer, said backing layer having perforations in communication with said perforations in said core layer; and
   an unfired ceramic fronting layer applied to said second veneer layer.

2. A flame-retardant wall panel, as defined in claim 1, wherein said ceramic comprises:
   approximately 5 percent to 20 percent clay;
   approximately 5 percent to 20 percent feldspar;
   approximately 5 percent to 20 percent silica;
   approximately 10 percent to 40 percent aluminum hydrate;
   approximately 10 percent to 40 percent talc;
   approximately 5 percent to 20 percent high-borate content frit; and
   approximately 20 percent sodium silicate.

3. A flame-retardant wall panel, as defined in claim 2, wherein said ceramic comprises:
   approximately 10 percent clay;
   approximately 10 percent feldspar;
   approximately 10 percent silica;
   approximately 20 percent aluminum hydrate;
   approximately 20 percent talc;
   approximately 10 percent high borate content frit; and
   approximately 20 percent sodium silicate.

4. A flame-retardant wall panel, as defined in claim 2, wherein at least one of said first and second adhesive coating layers is comprised of said ceramic.

5. A flame-retardant wall panel, comprising:
   a structural core having front and back faces;
   a first veneer layer adhesively attached to said back face;
   a second veneer layer adhesively attached to said front face; and
   flame-proofing means applied to said first and second veneer layers for preventing a flame from igniting said first and second veneer layers and said core layer, while allowing heat from said flame to pass through said flame-proofing means to char said core layer and said first and second veneer layers, said flame-proofing means comprising:
   an unfired ceramic backing layer applied to said first veneer layer; and
   an unfired ceramic fronting layer applied to said second veneer layer.

6. A flame-retardant wall panel, as defined in claim 5, wherein said core layer, said first veneer layer, and said backing layer are perforated.

7. A flame-retardant wall panel, comprising:
   a structural core layer having front and back faces;
   a first veneer layer bonded to said back face;
   a second veneer layer bonded to said front face; and
   flame-proofing means, comprising a layer of unfired ceramic material, applied to at least one of said first and second veneer layers for allowing the controlled charring of said veneer layers and said core layer when said panel is exposed to a flame, by inhibiting the flow of oxygen to said layers, and thereby preventing said layers from igniting in an open flame.

8. A flame-retardant wall panel, as defined in claim 7, wherein said flame-proofing means maintains its structural integrity when said panel is exposed to a flame, thereby preserving a substantial portion of the structural integrity of said panel when said veneer layers and said core layers are charred.

9. A flame-retardant wall panel, as defined in claim 7, wherein said panel has ventilation means for allowing the dissipation of heat and the ventilation of gaseous matter from said panel when said panel is exposed to a flame.

10. A flame-retardant wall panel, as defined in claim 9, wherein said ventilation means is a multiplicity of perforations in said panel.

11. A flame-retardant wall panel, as defined in claim 10, wherein said perforations pass through said backing layer, said first veneer layer and said core layer.

12. A flame-retardant wall panel, as defined in claim 7, wherein said unfired ceramic material is heat-conducting.

13. A flame-retardant wall panel, as defined in claim 7, wherein said unfired ceramic will harden when exposed to a flame while maintaining its structural integrity.

14. A flame-retardant wall panel, comprising:
a structural core layer having front and back faces;
a veneer layer adhesively attached to each of said front and back faces; and
non-combustible means comprising a layer of unfired ceramic material applied to at least one of said veneer layers for (a) inhibiting the combustion of said panel by hardening to provide a substantially air-tight fire break for said panel when said panel is exposed to a flame, and (b) allowing heat from said flame to char controllably said structural core layer and said veneer layers without igniting said structural core layer or said veneer layers.

15. A flame-retardant wall panel, as defined in claim 14, wherein said non-combustible means maintains its structural integrity when said panel is exposed to a flame, thereby preserving a substantial portion of the structural integrity of said panel when said structural layer is charred.

16. A flame-retardant wall panel, as defined in claim 15, further comprising:
ventilation means in said panel for allowing the dissipation of heat and the ventilation of gaseous matter from said panel when said panel is exposed to a flame.

17. A flame-retardant wall panel, as defined in claim 16, wherein said ventilation means is a multiplicity of perforations in said panel.

18. A flame-retardant wall panel, as defined in claim 14, wherein said layer of unfired ceramic material will harden when exposed to a flame while maintaining its structural integrity.

19. A flame-retardant wall panel, comprising:
a perforated structural core layer having front and back faces;
a first veneer layer attached by a first adhesive coating layer to said back face, said first veneer layer having perforations communicating with said perforations in said core layer;
a second veneer layer attached by a second adhesive coating layer to said front face, said second coating layer having perforations communicating with said perforations in said core layer;
a backing layer of an unfired ceramic material applied to said first veneer layer, said backing layer having perforations in communication with said perforations in said core layer;
a fronting layer of an unfired ceramic material applied to said second veneer layer, said unfired ceramic material comprising:
approximately 5 percent to 20 percent clay;
approximately 5 percent to 20 percent feldspar;
approximately 5 percent to 20 percent silica;
approximately 10 percent to 40 percent aluminum hydrate;
approximately 10 percent to 40 percent talc;
approximately 5 percent to 20 percent high borate content frit; and
approximately 20 percent sodium silicate.

20. A flame-retardant wall panel, as defined in claim 19, wherein at least one of said first and second adhesive coating layers is comprised of said unfired ceramic material.

21. A flame-retardant wall panel, comprising:
a structural core layer having front and back faces;
a veneer layer adhesively attached to each of said front and back faces; and
a coating of unfired ceramic substantially covering at least one of said veneer layers, said ceramic hardening into a ceramic film when exposed to a flame or high temperature so that an open flame is prevented from passing through the covered veneer layer of said wall panel, while heat from said flame is allowed to pass through said coating to char said structural core layer and said veneer layers in a controlled manner without ignition.

22. A flame-retardant wall panel, comprising:
a structural core layer having front and back faces;
a veneer layer adhesively attached to each of said front and back faces; and
a coating of unfired ceramic substantially covering at least one of said veneer layers, said ceramic comprising:
approximately 5 percent to 20 percent clay;
approximately 5 percent to 20 percent feldspar;
approximately 5 percent to 20 percent silica;
approximately 10 percent to 40 percent aluminum hydrate;
approximately 10 percent to 40 percent talc;
approximately 5 percent to 20 percent high-borate content frit; and
approximately 20 percent sodium silicate.

23. A flame retardant wall panel, as defined in claim 22, wherein said ceramic comprises:
approximately 10 percent clay;
approximately 10 percent feldspar;
approximately 10 percent silica;
approximately 20 percent aluminum hydrate;
approximately 20 percent talc;
approximately 10 percent high-borate content frit; and
approximately 20 percent sodium silicate.

* * * * *